United States Patent [19]

Kolster

[11] Patent Number: 5,920,877
[45] Date of Patent: Jul. 6, 1999

[54] TEXT ACQUISITION AND ORGANIZING SYSTEM

[76] Inventor: Page N. Kolster, 11872 Bray St., Culver City, Calif. 90230

[21] Appl. No.: 08/665,296

[22] Filed: Jun. 17, 1996

[51] Int. Cl.⁶ .................................................... G06F 17/21
[52] U.S. Cl. ........................................... 707/512; 707/530
[58] Field of Search .................................. 707/512, 513, 707/514, 517, 520, 530; 382/176, 177, 180, 321; 358/473, 474

[56] References Cited

U.S. PATENT DOCUMENTS

| | | | |
|---|---|---|---|
| 4,803,643 | 2/1989 | Hickey | 707/513 |
| 4,887,165 | 12/1989 | Sato et al. | 358/474 |
| 5,208,905 | 5/1993 | Takakura et al. | 707/515 |
| 5,392,447 | 2/1995 | Schlack et al. | 345/339 |
| 5,517,621 | 5/1996 | Fukui et al. | 707/517 |
| 5,555,362 | 9/1996 | Yamashita et al. | 707/517 |
| 5,623,679 | 4/1997 | Rivette et al. | 707/526 |

FOREIGN PATENT DOCUMENTS

| | | |
|---|---|---|
| 0-597-499 | 5/1994 | European Pat. Off. . |
| WO 94/00825 | 1/1994 | WIPO . |
| WO 95/11492 | 4/1995 | WIPO . |

OTHER PUBLICATIONS

Simpson, *Mastering WordPerfect® 5.1&5.2 for Windows™*, SYBEX Corporation, 1993, pp. x–xvii and xxx–xxxii.

*Primary Examiner*—Stephen S. Hong
*Attorney, Agent, or Firm*—Fulwider Patton Lee & Utecht, LLP

[57] ABSTRACT

A portable apparatus for directly acquiring text with a portable line scanner and organizing the acquired text in a selected format structure. The text is placed into the format structure as it is acquired. Control over the position of the acquired text in the format structure is provided by use of an ENTER key as well as other keys. Text attribute keys are provided for applying various attributes to the acquired text, such as italics, size, underlining, etc. Comments may be inserted by the user as desired and such comments are automatically placed inside a rectangular box and in a predetermined position. Footnotes having predefined text fields may also be inserted in the format structure by the user and the system displays a footnote panel to assist in creating the footnote.

23 Claims, 10 Drawing Sheets

FIG. 7

*Modern Art*

*Impressionism*[1]

*—Movement in painting between 1867 to 1886.*

> *It is important to note with any movement in art is a reflection of the times. For a new-generation of French painters in the late 1900's, the times of painting to depict life with historical overtones (painting the scenes just a camera would come to capture) were questioned and rebelled against in the school of arts.*

*—The most conspicuous characteristic of Impressionism was an attempt to accurately and objectively record visual reality in terms of transient effects of light and color.*

*—The principle Impressionist painters were Claude Monet, Renoir, Pissarro, Sisley, Berthe, Morisot, Guillaumin, and Bazille. Edgar Degas and Paul Cezanne also painted in impressionist style for a time in the early 1870's.*

[1]*Encyclopedia Britannica. Fifth Edition. 1994. Pg. 274.*

*Modern Art*

*Impressionism*[1]

*—Movement in painting between 1867 to 1886.*

> RESERVED FOR PERSONAL COMMENT #1

*—The most conspicuous characteristic of Impressionism was an attempt to accurately and objectively record visual reality in terms of transient effects of light and color.*

*—The principle Impressionist painters were Claude Monet, Renoir, Pissarro, Sisley, Berthe, Morisot, Guillaumin, and Bazille. Edgar Degas and Paul Cezanne also painted in impressionist style for a time in the early 1870's.*

[1]*Encyclopedia Britannica. Fifth Edition. 1994. Pg. 274.*

206

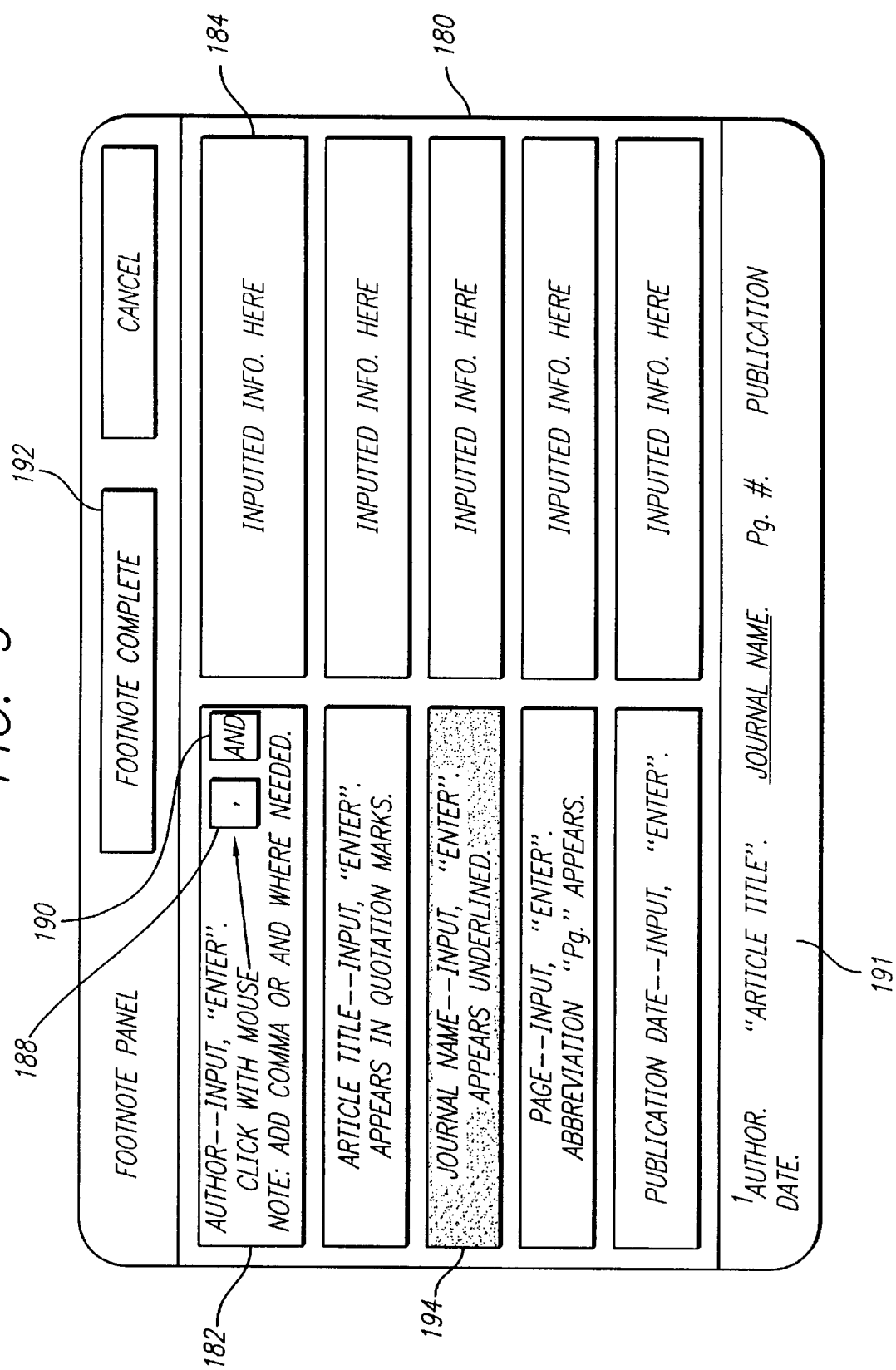

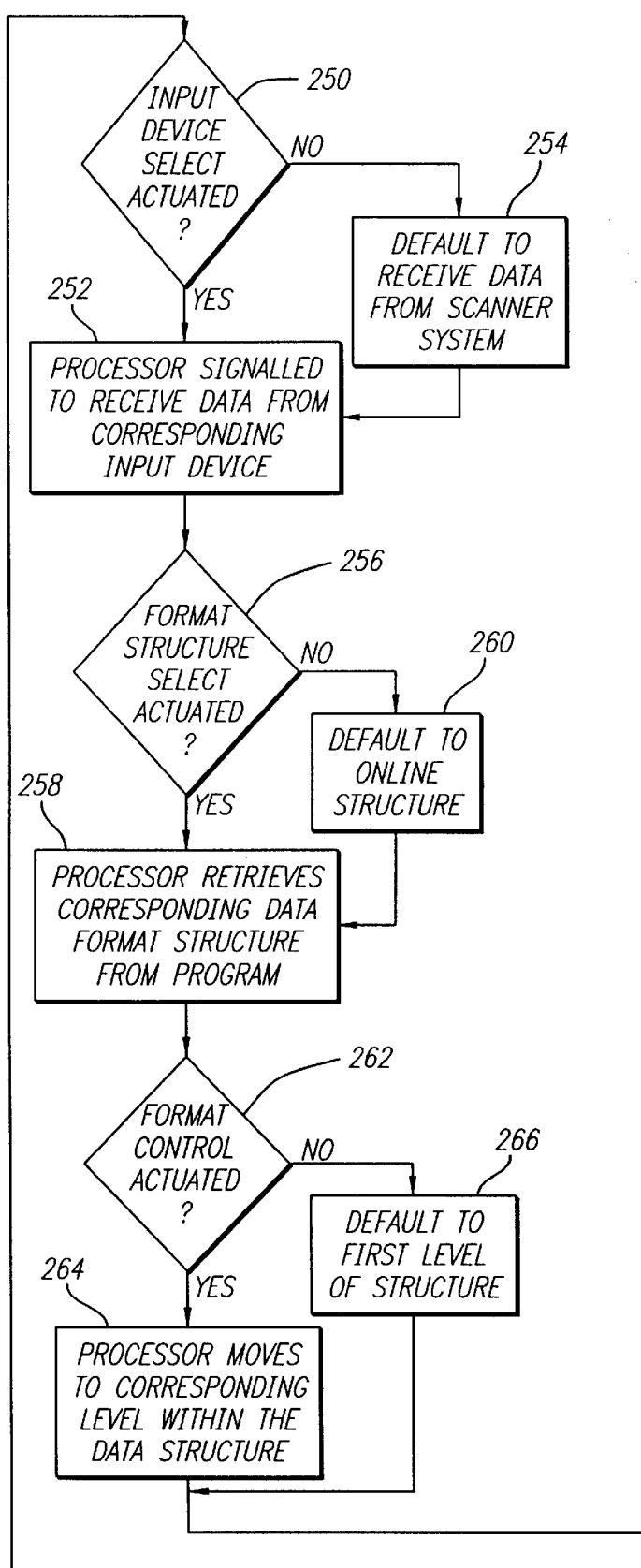
FIG. 12-(1)

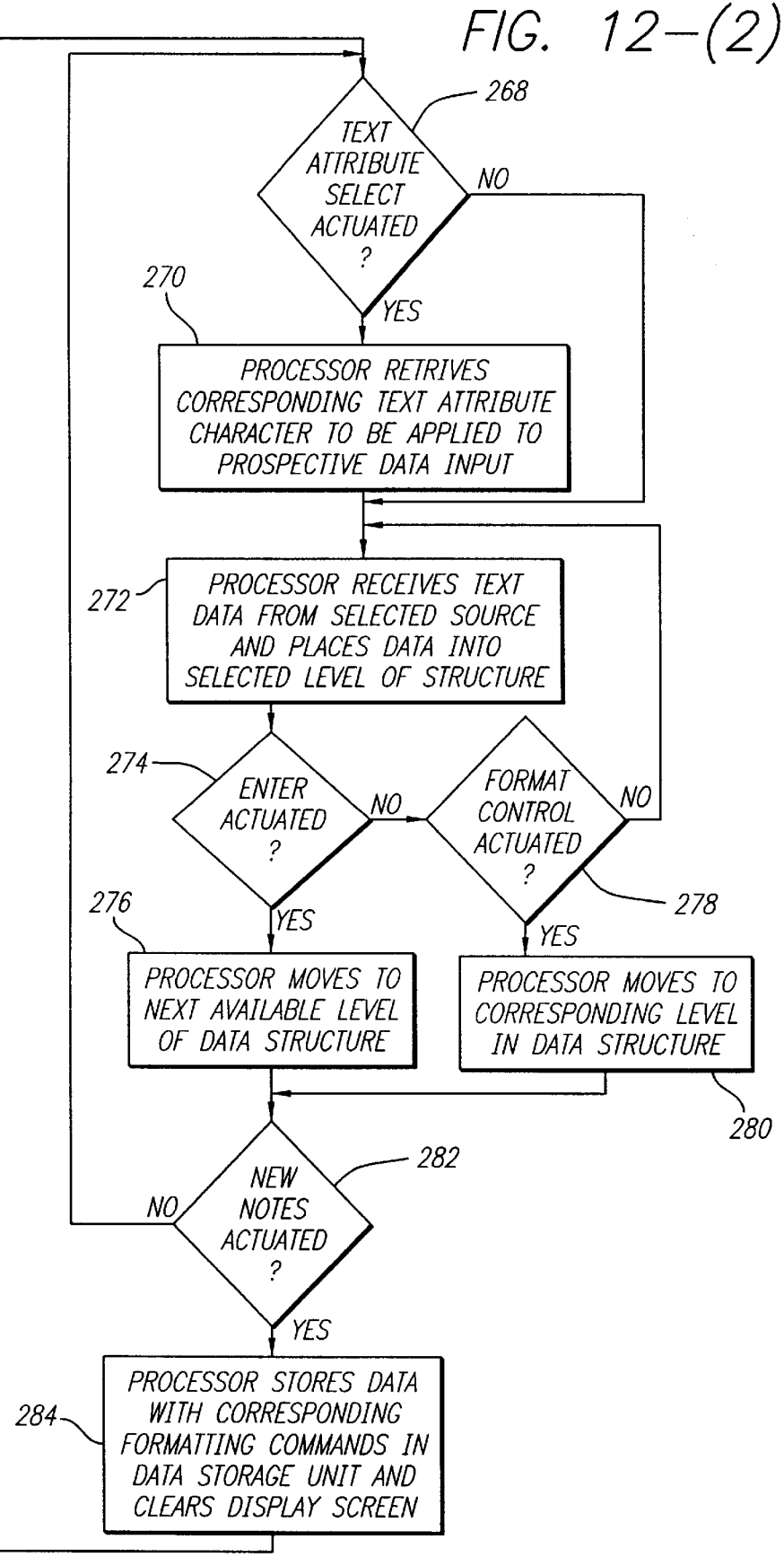

TEXT ACQUISITION AND ORGANIZING SYSTEM

BACKGROUND

The present invention relates to apparatus for acquiring and manipulating text and, more particularly, to apparatus for acquiring discrete text strings and automatically formatting those text strings, as they are received, into a preselected data format structure.

There are a number of situations in which a researcher or reader may desire to record and organize printed or displayed text included in an existing work for future reference or for some other future use. As used herein, the term "text" is meant to encompass information that is intended for presentation for human comprehension and may comprise symbols, phrases, sentences in natural or artificial language, pictures, diagrams, and tables. One such situation involves students who, when researching a topic during the preparation of a report or for satisfying a course requirement, encounter numerous reference books on the topic, each of which has an article or text passage that is relevant to the topic of research and each of which would be of value if it were included in the report. Rather than borrowing numerous reference books, or making numerous copies of pages of various reference books, many researchers would prefer to extract the relevant text passages and the bibliographic detail about the reference source in which the text passage was found and enter that information directly into a storage medium in an organized format for later use.

In some cases, because of time constraints, the researcher desires to organize the extracted text immediately and directly into a particular organization format structure, for example an outline format structure where certain text is located in certain positions on a page in relation to other text. For example, the researcher may desire to reproduce a printed phrase and position it as a main topic in an outline structure with a predetermined spacing from the left margin and a predetermined numerical or alphabetical designation preceding it. Additionally, the researcher may desire that the reproduced text be automatically formatted during entry into the format structure with a certain text attribute or attributes, such as underlining, bolding, italicizing, or others.

As used herein, the term "format structure" is meant to refer to an overall structure in which text is organized, including the particular placement of text in a location, such as indentation, margins, justification, the line spacing, and spacing on a page or in a document, the addition of numerical or alphabetical designations or leading characters at lines, particular text attributes assigned to text placed in particular locations, the page spacing, and other format characteristics. The term "text attribute" is meant to refer to a characteristic of text, such as its font, underlining, bold, italics, capitalization, size, etc.

In these cases where the amount of time available is limited, researchers do not have the luxury of being able to perform interim steps on text they find before that text is put into an organized format structure. The ability to directly place the acquired text into the desired format structure is highly desired. No time may be available for transcribing, proof reading, correcting or other similar steps. Additionally, researchers would find a benefit in having certain flexibility in creating the formatted, organized document with the format structure chosen. Researchers many times would appreciate the ability to automatically and manually add text attributes to acquired text, to be able to interlineate comments, and to record details concerning the source material, such as the bibliographic details of the reference source. In many cases, researchers desire to add certain comments concerning the text acquired so that at a later time, the researcher's thoughts or ideas concerning that text or its use or background would be available. It is desirable that such comments are clearly and automatically indicated as such by the system by attaching some attribute to it, such as by automatically placing a border around the comments.

Rather than hand writing the desired text into the format structure, which can be a time consuming and burdensome activity especially when the desired text is quite lengthy, it would be preferable to directly acquire the text via optical or other means from the source material and enter it directly into the selected format structure and into a computer compatible storage medium, such as a computer readable magnetic disk. Even acquiring text by dictating it into a dictation machine for recording on magnetic tape will not allow its direct entry into the format structure. The tape must later be transcribed at which time errors may be made, such as spelling errors, punctuation errors, and others. Poor articulation by the dictator or poor recording quality can result in a poor transcription result. The additional steps of transcribing and proof reading would be necessary to assure that the desired text was reproduced accurately and these additional steps require time that may not be available. Furthermore, if the dictated text must be manipulated again later, it must at some time be entered into electronic form to be compatible with a computer, which also exposes the work to errors during keyboard entry. Although the text can be directly entered into a computer during transcription, these errors may still be made.

Yet another conventional method used to acquire desired text is to manually input the text directly into a computer via a keyboard. A particular program, such as a word processing program, may be loaded into the computer and the text "keyed" into the computer and manipulated by the program to yield the desired organization of the text. However, this method suffers the shortcoming that the rate at which text may be input into the computer is dictated, and thus limited, by the speed at which the person types. Typing errors may be made and must later be identified and corrected. Even though many computers are portable and can easily be carried into libraries and other research facilities, these facilities, and particularly libraries, may not permit the noise resulting from the use of a keyboard (or dictation). Thus, the keyboard method of text acquisition is inefficient and time consuming, especially when the desired portion of text is quite long, and may not even be allowed in some research facilities.

Word processing programs allow users to manipulate text into almost any conceivable format structure; however, the text must first be put into an electronic form before the computer can manipulate that text. Typing the text with a keyboard has certain disadvantages as discussed above. Additionally, most word processing programs are general in nature and require significant effort to organize text into a particular format structure. For many researchers, having to spend time to learn how to operate a complex word processing program to perform a research support task is an undesirable exercise. It would be much more desirable for the researcher to have available a text acquisition and organizing system that has available a plurality of preprogrammed format structures, all of which are useful for research purposes, with additional flexibility for manipulating text, and all of which may be actuated with the press of only one or at the most only a few key strokes.

Although many word processing programs include an outline subroutine for organizing text into an outline format structure, other text format structures are not preprogrammed. In many cases, researchers are not satisfied with only an outline format structure and desire to organize text into other format structures. Furthermore, due to the desire of the creators of word processing programs to remain general and appeal to as wide a customer base as possible, the word processing programs discussed above do not include automatic prompting for the bibliographic details of the reference source, although they typically do include the ability to insert footnotes. Along the same lines, although many word processing programs include the ability to insert "text" boxes or other types of boxes that are set apart from surrounding text by some indicator, such as a partial border, creating such boxes takes significant effort requiring in some cases a selection of the type of border, the exact location of the box, and other box characteristics. For those who are pressed for time, a requirement to make multiple choices just to create a box is highly undesirable. It would be preferable to merely press a single key to create the box in which text is placed.

Obtaining and displaying text from other computers, such as text received from a remote computer via a modulator-demodulator ("MODEM"), can involve the acquisition of much extraneous text which requires extra steps to sort out. In the case of the word processing program, displayed text must first be selected, such as by "blocking" it with a cursor, then copied to a temporary text buffer, sometimes known as a "clipboard", and then recopied from the clipboard into the desired format structure. The interim step of using the clipboard increases the time required and exposes the text to loss if the correct procedure is not followed exactly.

There exist scanner devices that include optical assemblies that may be scanned across written text of interest to create digital image patterns corresponding to the text. An optical character recognition ("OCR") program may be used to interpret the digital image patterns and convert such patterns into a machine-readable character code such as ASCII to create a file that may be used by a computer to manipulate the text. However, uploading such text into a computer and manipulating such text with a word processing program or the like in order to then organize the text into the desired format structure involves the additional steps described above.

Hence, those skilled in the art have recognized a need for a text acquisition and organizing system that can acquire text directly from a text source to place it into a digital, electrical format and directly enter the text into a selected format structure thus avoiding additional manipulation steps. The need also exists for such a device having a plurality of selectable text format structures into which the acquired text may be automatically formatted as the text is received. Such automatic formatting into a structure should also include the automatic attachment of text attributes as well as the ability of the user to manually apply attributes and enter additional text that is automatically formatted in a desired fashion. A need has also been recognized for such a text acquisition and organizing system to be easy to use with as few required actuation commands as possible. The present invention fulfills these needs and others.

SUMMARY OF THE INVENTION

Briefly and in general terms, the invention is directed to an apparatus for acquiring discrete text strings and for organizing the acquired text strings into a format structure as the text strings are acquired. In one aspect, the apparatus comprises a housing of a size small enough to be portable, a scanner connected to the housing that scans printed text strings and acquires the text strings, manual format structure select means mounted in the housing for providing a structure select signal corresponding to one of a plurality of selectable format structures, a memory in the housing in which are stored the plurality of format structures each of which comprises a plurality of predetermined formatting controls for assignment to the text strings in a predetermined order as the text strings are acquired to position acquired text strings in relation to other acquired text strings in a predetermined order. Additionally, a processor is mounted in the housing, wherein the processor is responsive to the structure select signal to retrieve the corresponding format structure from the memory, and is responsive to the retrieved format structure for automatically formatting the acquired text strings to position said acquired text strings according to the retrieved format structure as the text strings are acquired. Also, a memory is mounted in the housing for storing the series of text strings after having been formatted by the processor in accordance with the selected text format structure, and a display is mounted on the housing for displaying the formatted text strings in the selected format structure.

In another aspect, the apparatus further includes a manual format control switch mounted in the housing, actuation of which provides a format control signal, wherein the processor is responsive to the format control signal to alter the predetermined order of application of formatting controls within the selected format structure to a subsequently acquired text string. In a more detailed aspect, the manual format control switch comprises a switch mounted on the scanner for providing the format control signal.

In a further aspect, the housing includes a comments switch for providing a comments signal. The processor is responsive to the comments signal to automatically place a subsequently acquired text string within a border and to automatically adjust the size of the border to accommodate the entirety of the subsequently acquired text string and to automatically place the bordered text string at a predetermined position. In a further detailed aspect, the housing also includes a signal switch mounted on the housing for providing a control signal. The processor is responsive to the comments signal followed by the control signal to automatically place a predetermined text string within a border and to automatically adjust the size of the border to accommodate the entirety of the text string accompanied by a number automatically assigned to identify that bordered text string, the processor also automatically placing the bordered and numbered text string at a predetermined position. The processor automatically increases the number assigned to subsequent bordered text strings to uniquely identify each bordered text.

In yet a further aspect, the housing includes a footnote switch for providing a footnote signal. The processor is responsive to the footnote signal to automatically connect subsequently acquired discrete strings of text with predetermined punctuation and to automatically locate the acquired and punctuated text strings in a predetermined position in relation to other text. In further detailed aspects, the processor is responsive to the footnote signal to provide a prompt comprising a footnote panel containing the names of a plurality of discrete text strings to be acquired in a predetermined order to be connected together to form a footnote. The footnote panel further comprises a display of the discrete acquired text strings as they are acquired permitting a review of the acquired text string before leaving the footnote panel. An additional panel is also displayed from which a discrete data string for the footnote may be acquired, said panel including numeric text.

In a further feature, the housing comprises a text attribute control means for providing text attribute control signals. The processor is responsive to the text attribute control signals to affect the format of a subsequently acquired text string in accordance with the text attribute control signals as the text string is received.

In yet another aspect, the apparatus comprises means for receiving text and displaying the received text on the display and means for selecting a text string from the displayed text and acquiring the selected text string. The processor is responsive to the retrieved format structure for automatically formatting the text string acquired from the display to position said acquired text string according to the retrieved format structure as the text string is acquired.

In further aspects, a note-taking apparatus in accordance with the invention comprises a portable scanner connected to the housing, the scanner adapted to scan a single text line at a time to acquire text.

Other aspects and advantages of the invention will become apparent from the following detailed description and the accompanying drawings illustrating, by way of example, the features of the invention.

BRIEF DESCRIPTION OF THE DRAWINGS

FIG. 7 is an example of a document produced in a "Points" format structure also showing the use of the Personal Comments and the Footnote features;

FIG. 8 is an example of a document produced in a "Points" format structure similar to FIG. 7 except that the Reserved Personal Comment feature has been utilized;

FIG. 9 is an example of a Footnote panel used in creating a footnote in accordance with the system of FIG. 1;

FIG. 12 is a flow chart for the text acquisition and organizing system shown in FIG. 1.

DETAILED DESCRIPTION OF THE PREFERRED EMBODIMENTS

Figure 1:
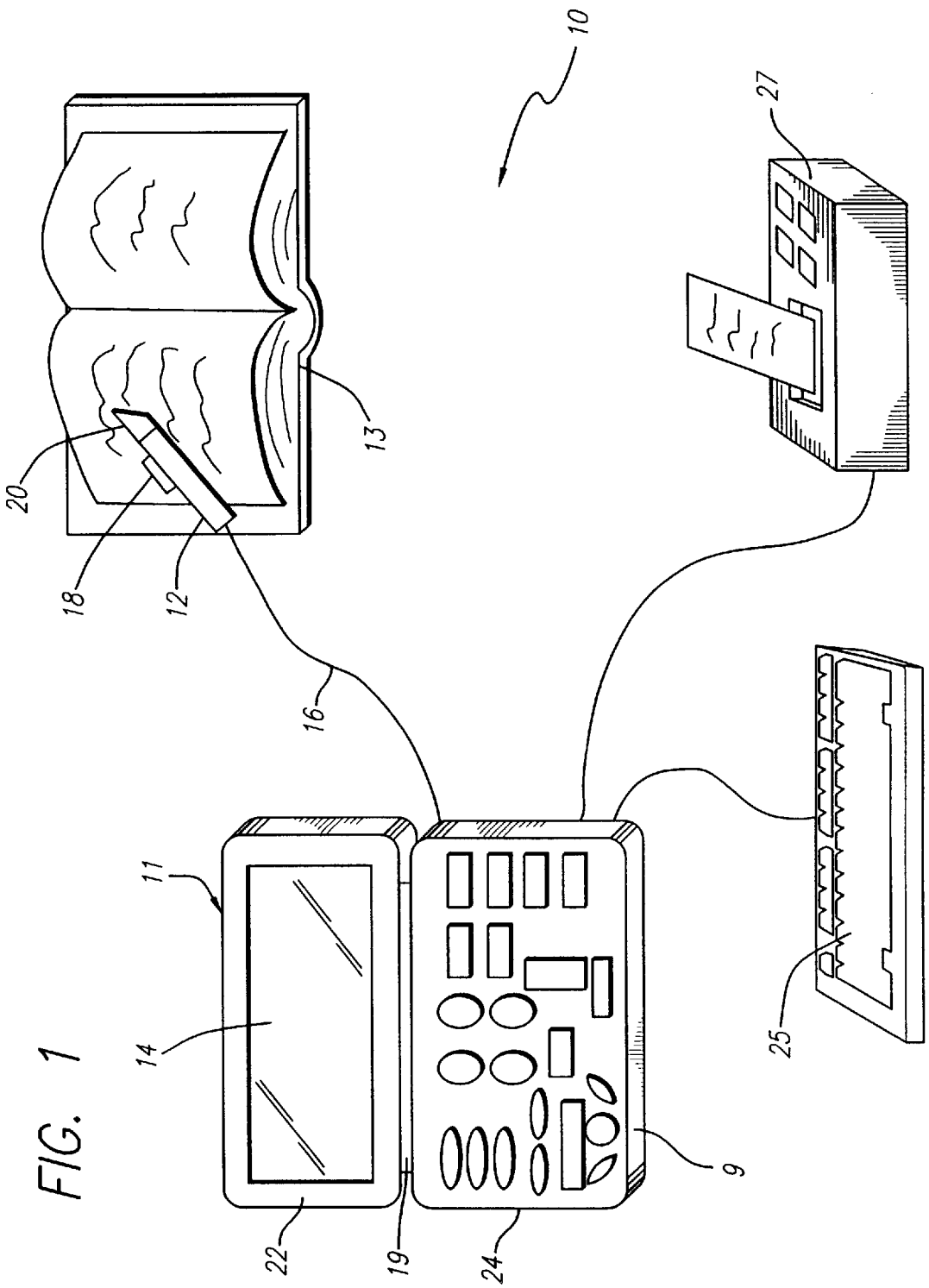
FIG. 1 is a view of an embodiment of a text acquisition and organizing system according to the present invention showing a display and control device connected to an optical scanner that is acquiring text from a printed source for direct input to a format structure active in the display and control device. A keyboard and printer are also shown connected to the system.
Figure 2:
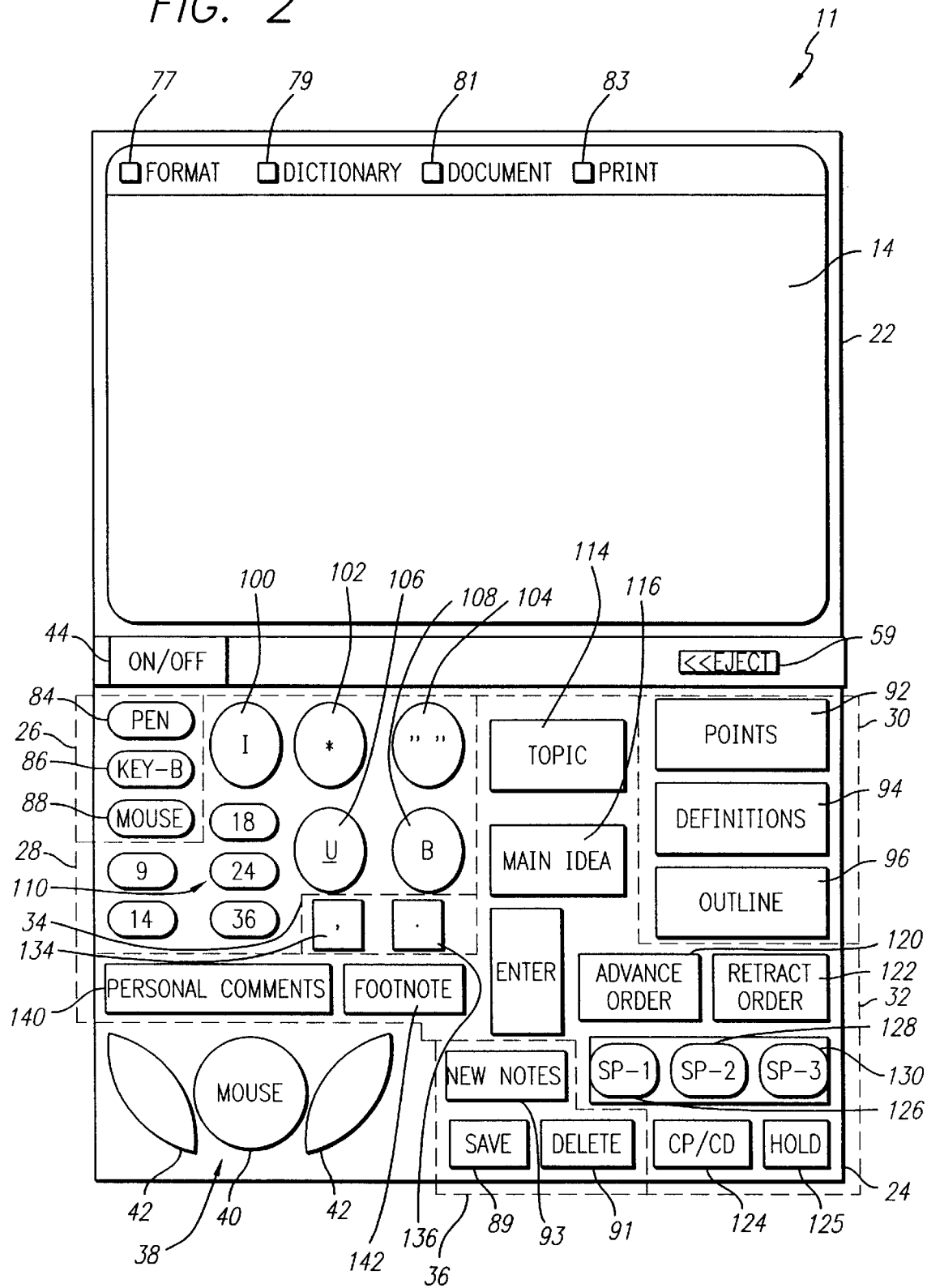
FIG. 2 is a diagram of the front panel of the display and control device shown in FIG. 1.
Figure 3:
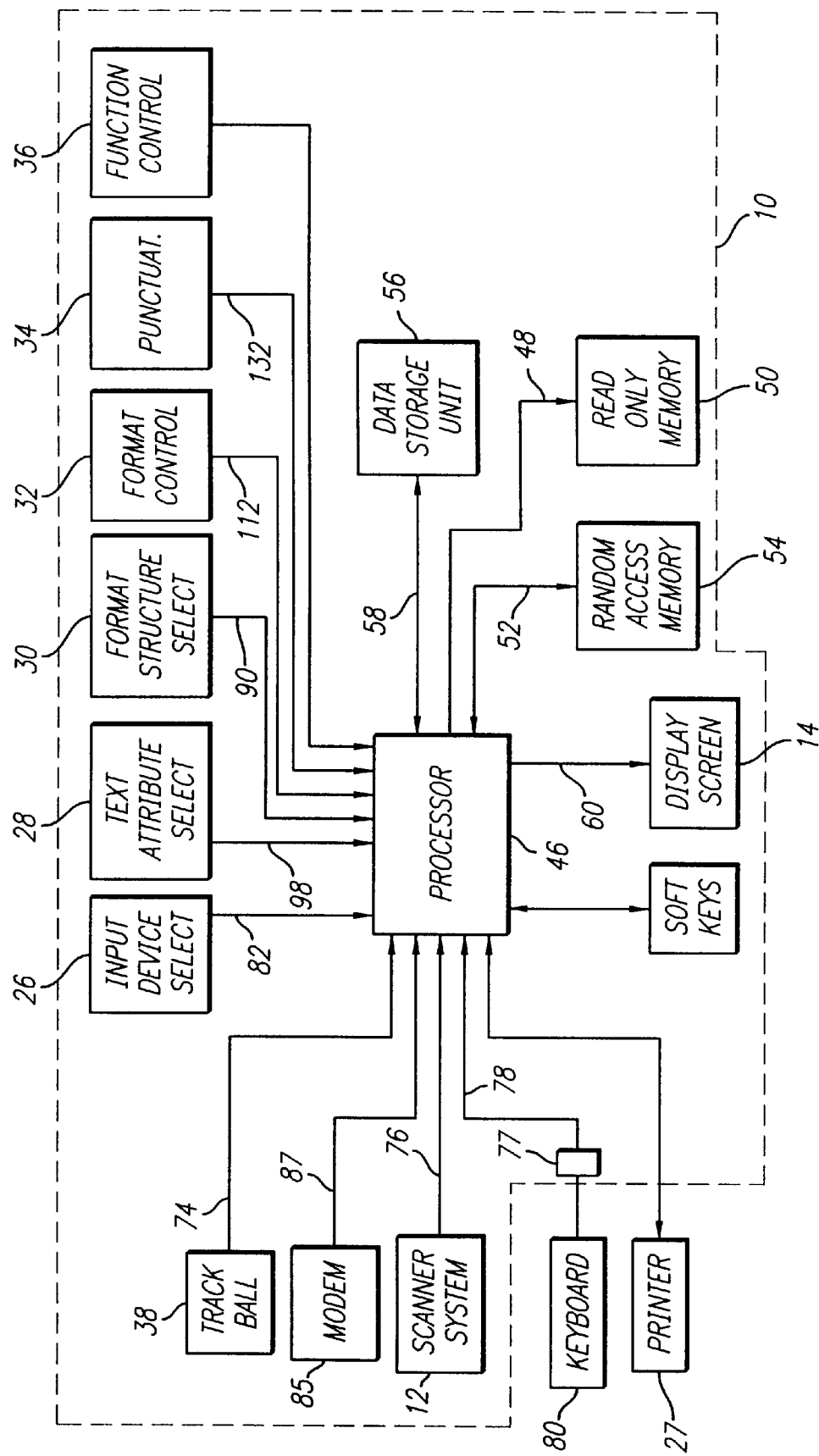
FIG. 3 is a block diagram of the text acquisition and organizing system shown in FIG. 1.

Referring now to the figures in which like numerals represent like or corresponding elements among the several views, in FIGS. 1, 2 and 3 there is shown generally a text acquisition and organizing system 10 including a processing unit 11 mounted in a portable housing 9 and an electronic scanner device 12 for acquiring discrete text strings from an external text source, such as the reference book 13, and for automatically formatting the acquired text strings as they are received into a text format structure selected from a plurality of text format structures. The acquired text formatted into the selected format structure will be displayed on a display screen 14 mounted in the housing 9.

In the preferred embodiment, the electronic scanner device 12 comprises a portable, hand held pen scanner tethered to the portable processing unit 11 via an umbilical cord 16 that includes electrical signal wires for electrically connecting the scanner device 12 to the processing unit 11. The pen scanner preferably includes a manually actuatable external switch 18 operative to provide a control signal transmitted along a signal wire in the umbilical cord 16 to the processing unit 11 to serve as an enter key as described in greater detail below. The scanner is capable of reading only one line of text at a time.

The scanner device 12 further includes an optical end, generally designated 20, that houses an optical system operative to scan over printed text and create a corresponding digital image file representative of the scanned text. An optical character recognition (OCR) program is included in the scanner device 12 in this embodiment and is applied to the digital image file by a digital signal processing unit (DSP) also included in the scanner device 12 to convert the scanned text into machine readable code such as ASCII text code. Such converted text code is then transmitted to the processing unit 11 for processing as described in greater detail below. In an alternate embodiment, an OCR program may be installed in the processing unit 11 for converting the image to text.

The processing unit 11 comprises a display section 22 and a control section 24 connected together by a hinge 19 to allow for the sections 22 and 24 to close up upon each other. During periods of non-use the respective housing sections may be pivoted relative to one another about the hinge 19 to bring the sections into confronting contact. A releasable hook and latch assembly (not shown) may be mounted on the sections 22 and 24 to releasably attach the housing sections together in a compact configuration for safe transport and storage.

The display section 22 includes a display screen 14 that preferably comprises an LCD display and has a rectangular configuration. The display screen receives the formatted text strings acquired by the system and displays such text strings in the selected format.

The control section 24 defines a control panel and has mounted thereon, in one case, a plurality of manually actuated keys comprising various control and select keys. The keys shown in FIGS. 2 and 3 have been grouped generally into the following categories: input device select keys 26, text attribute select keys 28, format structure select keys 30, format control keys 32, punctuation keys 34, and general function keys 36. The control section 24 further includes a conventional pointer device, generally designated by numeral 38, including a track ball 40 interposed between a pair of manually actuatable switches 42 and operative to manipulate a pointer within the display screen 14 as desired in order to reposition the cursor within the display, select certain menu items, and to select certain portions of text displayed on the display screen, as is well known in the art.

The control section 24 includes an on/off switch 44 electrically connected to a power supply (not shown) and operative to selectively connect power to the system 10. In one case, the system includes a battery (not shown) carried by the processing unit 11 and electrically connected through the on/off 44 switch to the electrical components of the system 10. The processing unit 11 may also be formed with a connector (not shown) for connection with one end of a power cord connected at its other end to an external power supply to deliver power to the electrical components of the system. In another embodiment, the scanner device 12 may have its own power system, such as a battery or batteries.

Also shown in FIGS. 1 and 3 are a keyboard 25 and a printer 27 connected to the control section 24. As discussed, these are devices that are connectable as needed and connectors have been provided at the control section 24 to accommodate their connection. Although not shown in FIGS. 1 and 2, the system 10 includes a floppy disk drive for magnetic storage of data.

Referring in more detail to FIG. 3, there is shown a processor 46 connected via a signal line 48 to a read only memory 50 ("ROM"). The ROM contains a program or programs that are retrieved and implemented by the processor to control the operation of the system. The programs comprise text format structure subroutines that include various text format structures including respective sets of formatting commands for automatic assignment to the acquired text strings in a predetermined order to thus configure the acquired text strings into the desired format structure.

The processor 46 is connected through signal line 52 to a random access memory 54 ("RAM"). The RAM serves as the primary storage for the system and stores the acquired text strings with the corresponding formatting commands and text attribute characters applied thereto by the processor and acts as an operational memory for various processor functions.

The processor 46 is further connected to a data storage unit 56 across signal line 58 for non-volatile storage of sets of acquired and formatted text strings. In one case the data storage unit comprises an internal hard drive for non-volatile storage. In another case, the data storage unit comprises a conventional floppy disk drive for non-volatile storage to a floppy disk mountable in the floppy disk drive, as discussed above. An eject button 59 (FIG. 1) is mounted on the control section 24 and is operative to signal the floppy drive to eject the floppy disk housed therein.

The processor 46 is connected across signal line 60 to the display screen 14. As text strings are input to the processor and formatted according to the selected text format structure retrieved from the ROM 50, the formatted text strings are displayed on the screen and stored in the RAM 54.

The processor 46 is further connected electrically to the various selector and control keys 26, 28, 30, 32, 34, 36, and 38 mounted on the control section 24. The respective selectors and controls allow for user control of the processor to format the acquired text strings as described in greater detail below.

The processor 46 is connected to the pointer device 38 across signal line 74 and to the scanner system 12 across signal line 17. The pointer device is operative to provide cursor control signals transmitted across signal line 74 to the processor for manipulation of the cursor within the display screen 14. The scanner system is operative to transmit converted text code to the processor across signal line 76.

The processor 46 is also connected to one end of a signal line 78 that terminates at its other end in a port 76 formed on the processing unit 11 for releasable connection with an individual character input device 80 such as a keyboard 25 (FIG. 1). The individual character input device is not an integral part of the system 10, but may be electrically connected to the processor through the input port 76 when desired to allow the user to input text to the processor via the individual character input device. The system 10 may also be connected to a printer 27 as shown when necessary to produce a printed copy of data within the system.

The processor 46 is connected to a conventional MODEM 85 across signal line 87. The MODEM is housed within the processing unit 11 and allows the system 10 to communicate with remote computer data bases via telephone lines. The ROM 50 includes conventional programming operable by the processor to connect the system with such data bases. The display screen 14 serves as the monitor to view the data communications and the pointer device 38 may be utilized to select desired portions of displayed text for processing, such as downloading such selected blocks to the computer for automatic formatting of those received blocks according to the text format structure selected.

Referring now to FIGS. 2 and 3 in more detail, the input device selector keys 26 are connected to the processor 46 via a bus 82. The input device selector keys, in one case, comprise a Pen key 84 for selection of a scanner as the input device, individual character input device key labeled as Key-b 86 for selection of a keyboard as an input device, and pointer device key labeled as Mouse 88 for selection of a track ball as the input device. Each of the respective keys is operative to provide a signal transmitted across the bus 82 for receipt by the processor 46. The processor is responsive to the respective signal received via the bus 82 to accept text signals provided as a result of use of the corresponding input device.

The text attribute selector keys 28 are electrically connected to the processor across a bus 98. The text attribute selector keys, in one case, comprise an italics key [I] 100, asterisk key [*] 102, quotation key [""] 104, underline key [U] 106, bold key [B] 108, and a plurality of font size keys, generally designated by numeral 110. The respective keys are operative to provide respective character attribute signals transmitted across a bus 98 to the processor. The processor is responsive to the particular character attribute signal received to retrieve from the ROM 50 and apply the corresponding text character attribute to the prospective text string received by the processor.

The format structure selector keys 30 are electrically connected to the processor 46 across a bus 90. The format structure selector keys, in one case, comprise a POINTS key 92, DEFINITIONS key 94, and OUTLINE key 96, the respective keys being operative to provide respective select signals transmitted to the processor. The processor is responsive to the respective signal received through the bus 90 to retrieve from the ROM 50 the corresponding subroutine with the selected text format structure to be applied to the prospective text strings received by the processor from the selected input device.

The format control keys 32 are electrically connected to the processor 46 across a bus 112. The format controls, in one case, comprise a Topic key 114, Main Idea key 116, ENTER key 118, Advance Order key 120, Retract Order key 122, CP/CD key 124, Hold key 125, SP-1 key 126, SP-2 key 128, SP-3 key 130, Personal Comments key 140, and Footnote key 142. The format control keys 32 are operative to provide respective format control signals transmitted to the processor via bus 112. The processor is responsive to the respective signal received to apply a corresponding format effector character to the prospective text string received to affect the positioning of such text string within the selected text structure relative to the other text strings in the structure. The personal comments key 140 and footnote key 142 both permit the addition of further text in a predetermined position. As will be discussed later, the personal comments feature automatically formats text into a bordered box while actuating the footnote key results in bibliographic text being automatically located at the bottom of a page.

Thus, it will be appreciated that although a particular text format structure is selected for application to the prospective text strings received in a predetermined order, the user may, at any time during the text acquisition process, actuate one or more of the format control keys to control the processor to affect the format of prospective text strings received.

The punctuation selector keys 34 are electrically connected to the processor across a bus 132 and, in one case, comprise a comma key 134 and a period key 136. The respective keys are operative to provide character input signals transmitted to the processor. The processor is responsive to the particular signal received to insert a corresponding character or characters between the end of the last text string acquired and formatted before the key was actuated and the next text string to be acquired.

General function control keys 36 provide standard functions. A Save key 89, DELETE key 91, and New Notes key 93 are provided in this embodiment. The Save key is operative to provide a signal to the processor 46 to store the formatted text strings thus far acquired and entered into the selected format structure to the data storage unit 56. The DELETE key 91 is operative in connection with the pointer device 38 to delete selected blocks of text from the display screen 14. The user blocks a selected section of text with the pointer device and actuates the DELETE key to signal the processor 46 to remove such block of text from the formatted text structure. The New Notes key 93 is operative to signal the processor 46 along signal line 95 (FIG. 2) to save the formatted structure displayed on the screen 14 to the data storage unit 56 and to clear the screen 14 to begin a new text structure.

Thus there are thirty-five hardware keys shown (excluding the track ball keys). Aside from the control keys for the power, disk eject, and track ball control, a single press of each of these keys or switches results in substantial format structure or text attribute changes as well as input device selection. Such a simplified approach to obtain control over the acquisition and organization of text is highly desirable. A user can simply use the basic text format structure or can easily modify that structure with the press of a clearly marked key that will produce an intuitively apparent result. The user need not spend a large number of hours learning a complex word processing program requiring multiple keystrokes for most of the features made available by a single keystroke of the keys shown in FIG. 2 and described above. Additionally, the system shown in FIGS. 1 through 3 provides the ability to easily interject personal comments about the text acquired and organized as well as easily acquire and organize bibliographic data about the reference source from which the text was obtained.

Figure 4:
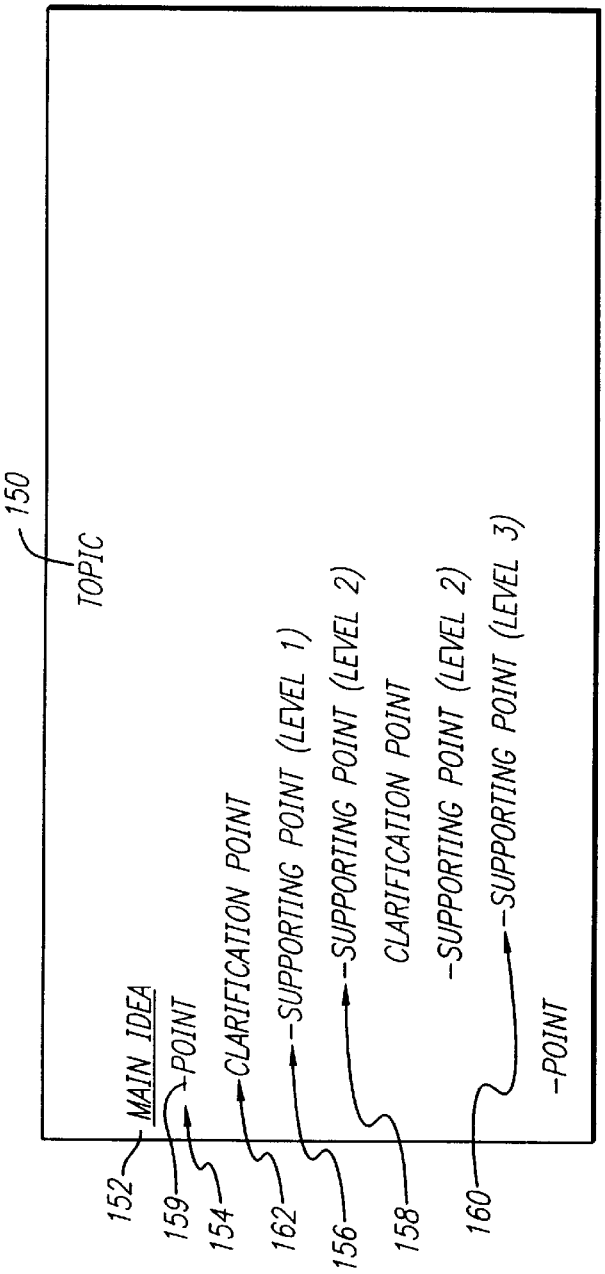
FIG. 4 is an example of a "Points" format structure showing the basic elements of the structure.

Referring to FIG. 4, there is shown an example of a "Points" text format structure created by the system 10. Upon actuating the POINTS key 92 (FIG. 2), the processor begins at the first level by automatically moving the cursor to a selected position, such as two spaces indented from the left margin, and by inserting an identifying character which is a hyphen 159 in the case of FIG. 4. The processor will automatically place the subsequently received "Point" text after that hyphen. Subsequent actuation of the ENTER key 118 mounted on the control section 24 or the button 18 on the scanner device 12, results in the processor automatically moving the cursor two lines down and again indenting the cursor a predetermined number of spaces from the left margin (in this case two spaces), and inserting a leading hyphen in preparation for receiving the text of another point. This preparation by the processor in automatically positioning the cursor and inserting a leading hyphen is prerequisite to the processor accepting text input for a Point. As used herein, reference to pressing the ENTER key 118 is meant to include sending the signal provided by the ENTER key whether the ENTER key is pressed to do so, the button 18 on the scanner device 12 is pressed to do so, or other means are used to send such signal.

After the text input at the first level, "Supporting Points" may be added by actuating the appropriate switch in the control section 24. If a Supporting Point of level one 156 is desired, the SP-1 key 126 is actuated and the processor automatically moves the cursor into a predetermined subordinate position to the preceding Point level, in this case two lines down and three spaces indented 156 from the Points first level (total of a five-space indentation from the left margin), and adds a leading hyphen.

If a Supporting Point of level two 158 is desired, the SP-2 key 128 is actuated and the processor automatically moves the cursor into a different subordinate position, in this case two lines down and three spaces indented 158 from a previous Supporting Point level one (total of an eight-space indentation from the left margin), and adds a leading hyphen.

If a Supporting Point of level three 160 is desired, the SP-3 key 130 is actuated and the processor automatically moves the cursor into a different subordinate position, in this case two lines down and three spaces indented 160 from a previous Supporting Point level two (total of an eleven-space indentation from the left margin) and adds a leading hyphen.

For the processor to enter into a Supporting Points level one, a Points level one having a text string must have immediately preceded it. Similarly, prerequisite to the processor entering into Supporting Points levels two or three is the immediately preceding existence of the next higher Supporting Points level with a text string.

Upon actuating the ENTER key 118 after entering a text string or not entering a text string in any Points or Supporting Points level, the processor automatically moves the cursor two lines down from the preceding text string, regardless of its level, and returns to the Points first level, with the processor being receptive to the user again selecting any of the Supporting Points levels for which prerequisites have been met.

After the user has input a text string for a Points level or a Supporting Points level, the user can then select another level equal to, one level subordinate, or any level above the last level. For example, after the user has input a text string for a Supporting Point level one 156, the user may then select the SP-1 key 126, the SP-2 key 128, or press the ENTER key 118. The user cannot however, enter the Supporting Points three level 160 without first entering a Supporting Points two level 158 and entering a text string. Each time the user inputs a text string for a Points first level 154, the processor makes a definite return to another Points first level 154 where the user may again start adding Supporting Points through meeting prerequisites.

In all format structures the user may select the "Topic" key 114 at any time. Upon selecting the "Topic" key, the processor moves the cursor two lines down from any previous level, including itself, and centers the cursor 150. Upon actuating the ENTER key 118 (or the button 18 on the scanner device 12) subsequent to either making an input or failing to make an input as a topic, the processor moves two lines down from a preceding text string, regardless of its level and returns to level one of the presently-selected format structure.

In all format structures, the user may select the "Main Idea" key 116 at any time. Upon selecting the "Main Idea" key while in the format structure Points, the processor moves the cursor two lines down from any previous level, including itself, and positions the cursor at the left margin 152. All text received is given initial capitalization and in the Points format structure, is also underlined. Upon actuation of the ENTER key 118 subsequent to either making an input or failing to make an input as a main idea, the processor moves two lines down from a preceding text string, regardless of its level and returns to level one of the selected format structure.

In all format structures, the user may also select the "CP/CD" or "clarification point/clarification definition" key 124. Upon actuating the CP/CD key 124, the cursor moves two lines down from any preceding entry, including itself, and creates an indentation equal to the number of spaces preceding the first word of a text string in the preceding level, so to align the text as clarification 162 with the first word in the preceding level. In the example of FIG. 4, no leading hyphen is inserted by the processor. Upon actuation of the ENTER 118 key subsequent to either making an input or failing to make an input as a clarification, the processor moves two lines down from a preceding text string, regardless of its level and returns to level one in the format structure.

For the processor to move into the position to receive clarification text, the first level of the Points format structure is prerequisite. That is, there must first have been entered some text to be clarified.

Figure 5:
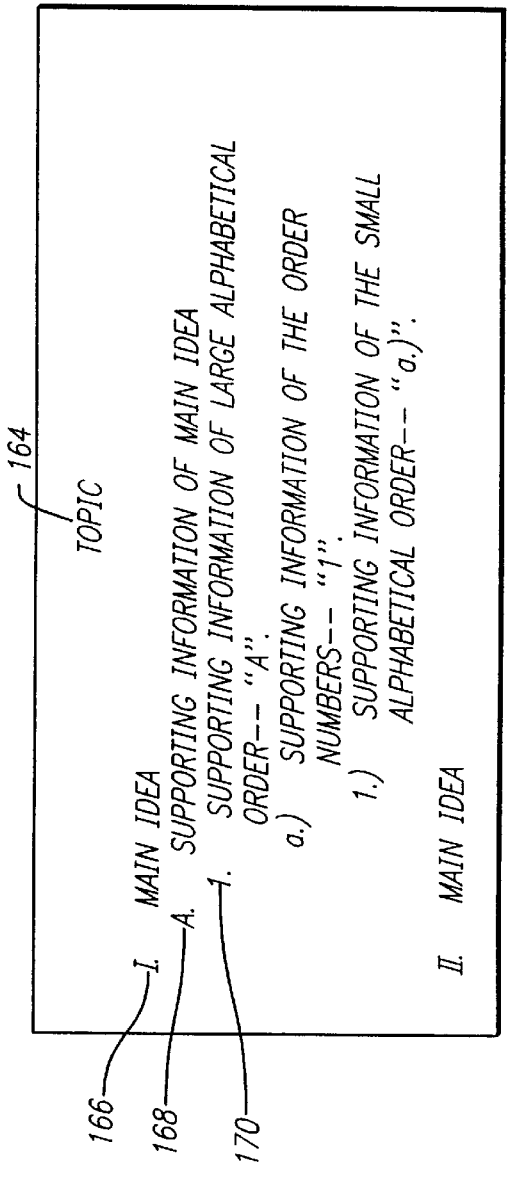
FIG. 5 is an example of an "Outline" format structure showing the basic elements of the structure.

Referring now to FIG. 5, an "Outline" format structure is shown. Upon pressing the OUTLINE key 96, the processor automatically moves the cursor to a point that is two spaces indented from the left margin and inserts the capital letter "A" 168 followed by a period, then moves the cursor two spaces to the right of the period of the capital letter for receiving a text string. Subsequent actuation of the ENTER key 118 results in the processor automatically moving the cursor one line down, creating an indentation of two spaces from the left margin, and inserting the next subsequent capital letter of the alphabet followed by a period, and placing the cursor two spaces to the right of the period of that capital letter for receiving text.

After entering a text string for the first capital letter of the Outline structure's first level ("A"), the user can actuate the Advance Order key 120 on the control section 24 to have the processor move forward one subsequent level 170 in the format structure. That first subordinate level has the Arabic number "1." indented by four spaces in the example of FIG. 4. Subsequent subordinate levels to which the processor can move forward by pressing the Advance Order key 120 each have leading characters, such as lower-case letters "a.)" and numbers "1.)" coupled with a close-parenthesis mark. Other leading characters may be used. Each subsequent level is positioned one line below the previous level and further indented by two spaces from the preceding level.

A Retract Order key 122 on the control section is operative to move the processor backward to superior levels as far as the Outline first level before the subsequent text string is received.

For the processor to move to level two, represented by the Arabic number "1.", alphabetical level one is prerequisite and must have an associated text string. For the processor to move to level three represented by the lower-case letter "a.)" by pressing the Advance Order key, the first numerical level two is prerequisite and must have received a text string. For the processor to move to level four represented by the number "1.)" by pressing the Advance Order key, the first alphabetical designation of level three is prerequisite and must have received a text string.

When at level one, two, three, or four, subsequent actuation of the ENTER key 118 results in the processor remaining at its present level and providing the next alphabetical or numerical leading character at that level prior to receiving the next text string. Similarly, in a case where the user presses the "Retract Order" key 122 or the "Advance Order" key 120, the processor moves to the next superior or subordinate level respectively and provides the next alphabetical or numerical leading character at that level prior to receiving the next text string. For the processor to move one line down and to prepare for receipt of a new text string according to the level operative in the format structure Outline, there must have been a text string received in the immediate preceding level.

The user may select the "Topic" key 114 at any time. Upon selecting the "Topic" key, the processor moves the cursor two lines down from any previous level, including itself, and centers the cursor 164. Upon actuating the ENTER key 118 subsequent to either making an input or failing to make an input as a topic, the processor moves two lines down from a preceding text string, regardless of its level and returns to level one of the presently-selected format structure.

As discussed above, the user may also select the "Main Idea" key 116 at any time. Upon selecting the "Main Idea" key while in the format structure Outline, the processor moves the cursor two lines down from any previous level, including itself, and positions the cursor at the left margin 152. The processor inserts a roman numeral followed by a period, and positions the cursor two spaces after the period of the roman numeral to receive a text string. All text received is given initial capitalization. Upon actuation of the ENTER key 118 subsequent to either making an input or failing to make an input as a main idea, the processor moves one line down from a preceding text string, regardless of its level and returns to level one of the Outline format structure. The roman numeral inserted corresponds to the next subsequent roman numeral after the preceding roman numeral in using the Outline format structure. In the case where a new Topic is selected in the Outline format structure, the processor restarts the counter at roman numeral "I."

The "CP/CD" or "clarification" key 124 may also be used in the Outline format structure. Upon actuating the CP/CD key, the cursor moves two lines down from any preceding entry, including itself, and creates an indentation equal to the number of spaces preceding the first word of a text string in the preceding level, so to align the text as clarification with the first word in the preceding level. Although not shown in FIG. 5, clarification text would be positioned similarly as shown in FIG. 4. Upon actuation of the ENTER 118 key subsequent to either making an input or failing to make an input as a clarification, the processor moves two lines down from a preceding text string, regardless of its level and returns to level one in the format structure. The CP/CD key 124 may be relabeled to the "CP/CD/CO" key if desired to mean "clarification point/clarification definition/clarification outline", although it has not been done in this case.

Figure 6:
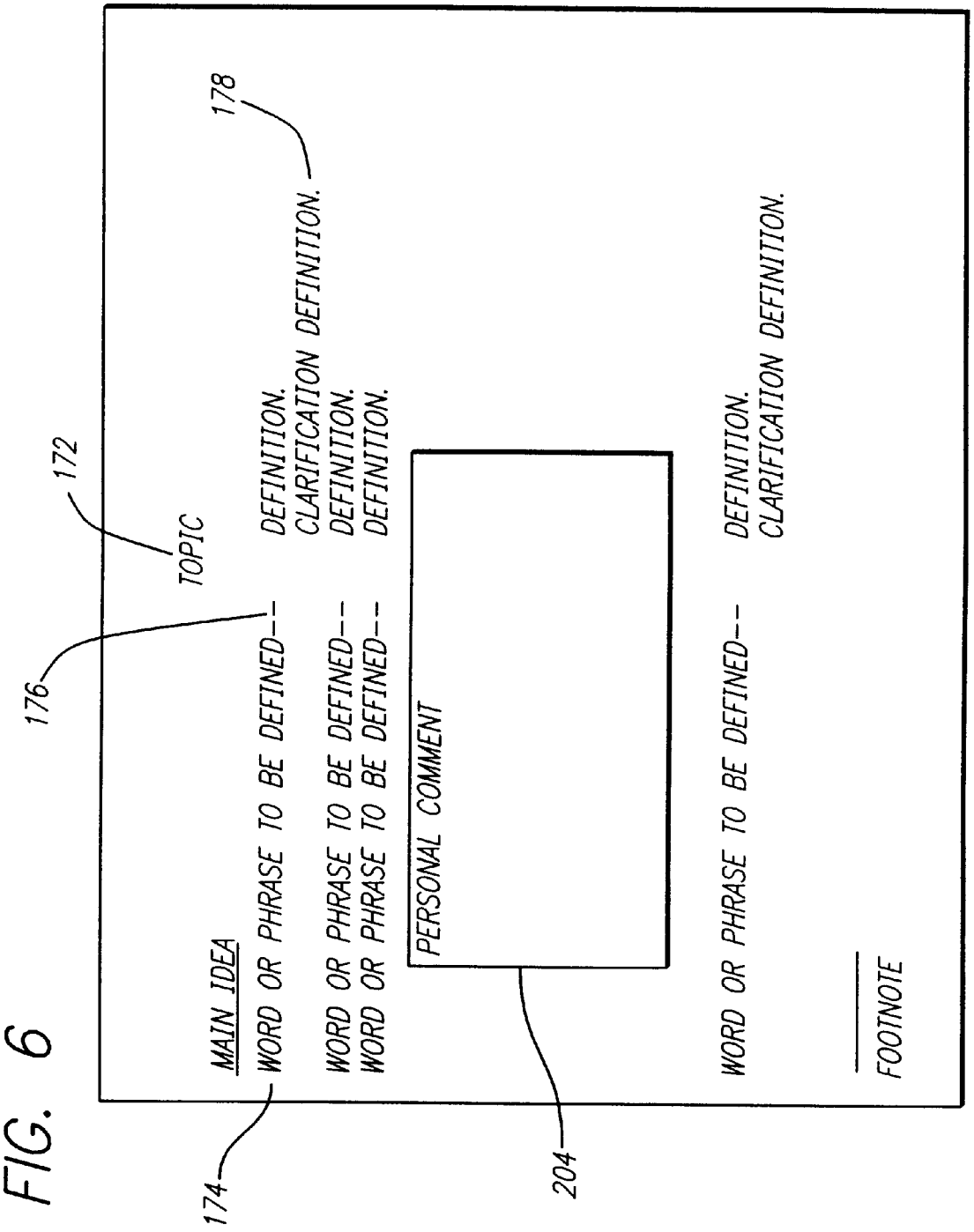
FIG. 6 is an example of a "Definitions" format structure showing the basic elements of the structure.

Referring to FIG. 6, there is shown an example of a "Definitions" format structure created by the system 10. Upon actuating the DEFINITIONS key 94, the processor positions the cursor at the left margin as a first level. Text may then be entered for the word or phrase to be defined 174. Upon actuation of the ENTER key 118, the processor inserts a pair of hyphens 176 immediately after the first text string and moves to the second level within the format structure to position the second text string 179 immediately after the two hyphens beginning on the same line. This second text string may comprise the definition. A period is automatically added after the definition.

The second line of text and text thereafter input at level two is indented two spaces from the left margin. However, if the first line of text for the second level begins at the beginning of a line below the line on which level one is located, then the first line of text and text thereafter for level two has an indentation of two spaces. For the processor to move to level two, a text string existing in level one is prerequisite. Upon actuation of the ENTER key, subsequent to the input of a text string for level two, the processor moves the cursor two lines down and returns to level one.

The user may select the "Topic" key 114, the "Main Idea" key 116, and the "CP/CD" or "clarification" key 124 at any time while in the Definitions format structure with the resulting automatic cursor positioning and formatting applied by the processor as described above. However, a text string in level two is prerequisite to receiving text for a clarification definition.

A personal comment may be added by the user that records the user's own ideas in any of the selectable format structures shown in FIGS. 4, 5, and 6. Pressing the Personal Comments key 140 (FIG. 2) will cause the processor to indent subsequently received text from the left margin equal to the number of spaces preceding the first word of a text string in the preceding level and to completely surround that comment text by a rectangular border 204 as shown in FIGS. 6 and 7. Text for a personal comment may be input through any of the input devices, such as the keyboard 25 and the scanner device 12. When the user has input the entire comment, a press of the ENTER key will cause the processor to leave the personal comment subroutine. The processor will not move into the position for receiving a subsequent text string as a "Personal Comment" in the Points and Outline format structures unless a first level text string exists. In the Definitions format structure, level two text is prerequisite to receive a comment text string.

Another personal comment feature is the Reserved Personal Comment 206 shown in FIG. 8. In a case where the user does not wish to connect a keyboard to input her own ideas immediately, a reserved personal comment may be inserted into the document to show the user where a comment should be when later connecting a keyboard 25. The comment may then be typed or scanned into the reserved position by placing the cursor in the created comment box and acquiring data. When the user presses the Personal Comments key 140 and then presses the ENTER key 118 (or the button 18 on the scanner device 12) before any text was input, the processor places the words "RESERVED FOR PERSONAL COMMENT" in the rectangular bordered box 206 and leaves the subroutine at the next press of the ENTER key 118. A reference number is automatically inserted into the box by the processor. The user may use this reference number to correlate the box with presently existing comments written in a different location by writing the reference number next to those comments.

A Hold key 125 on the control panel 24 can be actuated subsequent to the user selecting the keys Topic 114, Main Idea 116, CP/CD 124, SP-1 126, SP-2 128, SP-3 130, and Personal Comments 140 to instruct the processor not to return to level one in the presently-selected format structure subsequent to the ENTER key 118 being pressed and instead remain at the last-selected format control level. To cancel the hold function, the Hold key 125 can again be actuated or any of the format control keys located on the control panel 24 usable in the particular selected format structure.

Figure 10:
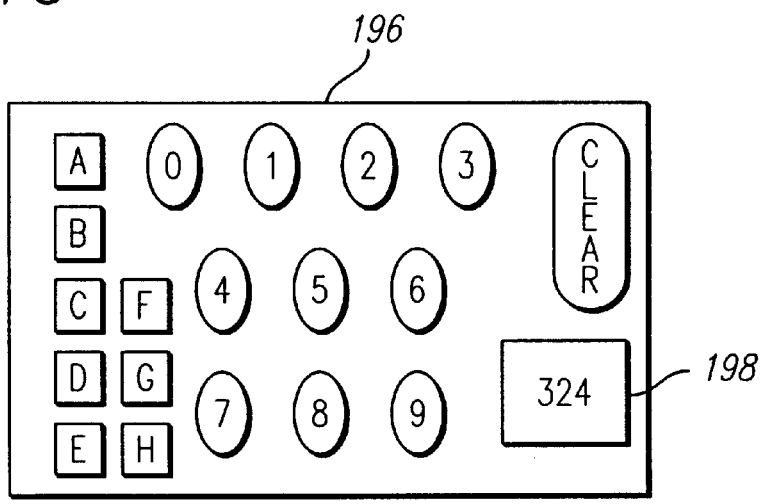
FIG. 10 is a page number panel used when creating a footnote.
Figure 11:
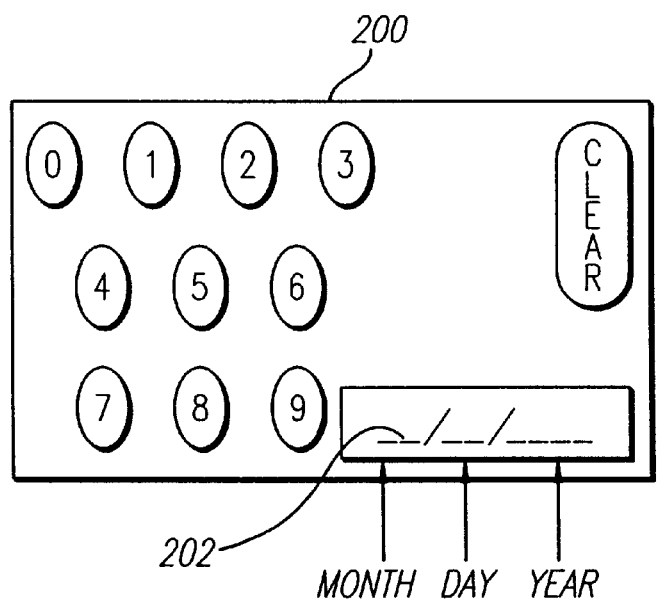
FIG. 11 is a date panel used when creating a footnote.

Referring now to FIGS. 9, 10, and 11, the footnote feature will be described. In all text format structures provided by the system 10 shown in FIG. 1, a footnote may be added to the created document. Because the system shown and described herein is used for acquisition and organization, the footnote feature allows the user to insert information into the document being created that pertains to the source from which the text is being acquired or the source from which the text was cited. FIG. 6 shows the footnote positioned at the bottom of the page; however, the footnote may be positioned at the end of the document as an endnote as described below.

When the Footnote key 142 is pressed, a footnote assistance panel 180 containing a plurality of information fields will appear on the display screen 14. As is seen in FIG. 9, a combination of the use of the track ball 38 with its pointer and the scanner device 12 will result in the entry of the information shown. In particular, the processor expects to be provided with: author; article title; journal name; page; and publication date for each footnote. The footnote panel 180 guides the user through this process of entering this text by illuminating the particular instruction. After pressing the footnote key 142, the first block "Author" 182 will be illuminated. The user will then scan in an author's name. The scanned-in text will appear in the display box 184 to the right of the "Author" instruction box 182 so that the text may be monitored. Pressing ENTER will result in the panel illuminating the next instruction box labeled "Article Title" 186. However, if more names are desired for the "Author," the user may click on the "," [comma] box 188 or the "and" box 190. The above process continues through all boxes. A main display box 191 at the bottom of the panel 180 shows the footnote as it progresses. When all footnote information has been entered, the user may click on the "Footnote Complete" box 192 which will then cause the program to save the footnote in the appropriate position.

As used above, "illumination" is meant to include highlighting of some type. This may include a different color from the background, a bolding, a shading, as shown in box 194 In FIG. 9, or other means to set a box apart from the others.

When the user proceeds to a box requiring the input of numerical information, a pair of panels shown in FIGS. 10 and 11 are provided on the display screen 14. The tract ball 40 may be moved to position the pointer over the appropriate letter or number and one of the track ball keys 42 pressed to input that number or letter. For example, when a page number is required, the alpha-numeric panel 196 shown in FIG. 10 is provided. The display box 198 shows the page number selected before the ENTER key is pressed so accuracy ay be checked. Where a date is needed, the date panel 200 is displayed and the date selected is shown in a display box 202 before the ENTER key is pressed. If a keyboard 25 is connected, it may be used to input the information required by the footnote, alpha-numeric, and date panels 180, 196, and 200.

In addition to the "hard" keys described above, the display screen 14 includes a plurality of "soft" keys made available when the system is turned on. These are considered "soft"

keys in that they are programmed into the screen and are actuated by positioning a cursor over the key and pressing an appropriate switch, such as one of the switches 42 associated with the track ball. In the embodiment of FIG. 2, these soft keys provide a Format menu 77, a Dictionary menu 79, a Document menu 81, and a Print menu 83 (FIG. 1). The track ball device 38 may be utilized to move the screen pointer over one of the menus and the pointer device switch 42 actuated to select the desired menu.

All subsequent lines of text are aligned at the left with the first word of the first line in all the format structure levels with the exception of the second level in the Definitions format structure where the second line of text and text thereafter is indented two spaces. However, if the first line of text for the second level begins at the beginning of a line below level one, then the first line of text and text thereafter for level two has an indentation of two spaces.

The processor capitalizes the first word of every text string. Similarly, the processor ends every text string with a period except a text string input as a topic or main idea.

In all levels and in all format structures, one or more of the text attribute selector keys 28 may be pressed to apply a corresponding text attribute or attributes to the prospective text string received. For example, the text string may be underlined, italicized, or bolded. To turn off the attribute, the same key is pressed again and subsequently received text will not longer have the attribute.

The format menu 77 provides additional format features for application to prospective text strings received by the processor 46. Such features include spacing features such as double and single spacing, and sequential numbering of the entries in the Definitions and Points subroutines. The processor is responsive to the feature selected to affect the format of the text structure accordingly.

The dictionary menu 79 includes dictionary and thesaurus functions. A user may input a word of interest via the individual character input device 80, and the processor 46 will retrieve from the ROM 50 the definition of that word, any synonyms and antonyms therefor and display such results on the display screen 14. The definition retrieved may be added to the document. In this way, the dictionary also acts as a reference source.

The document menu 81 includes as features a page numbering function, a table of contents function, index, and appendix functions. If the user selects the table of contents function, the processor retrieves entries of a predetermined or selected level in the created text structure, such as all "topic" entries and creates a table of such entries at the front of the document with the corresponding page of each such entry. If the user selects the index or appendix functions, the processor retrieves all entries of a certain level or levels, for example all "Topic" and "Main Idea" (index), and words to be defined in the Definitions sub-routine (appendix) and arranges such entries alphabetically into a table with the corresponding page of each such entry at the end of the document.

The print menu 83 allows a user to download a text structure to a remote printer to create a hard copy. The processing unit 11 preferably has a port (not shown) connected to the processor 46 and configured for connection with the printer to allow for text transfer from the processor to the printer.

Referring now to FIG. 12, there is shown a flow chart depicting the general overall operation of the system 10. After power is applied to the system, the processor awaits an input device selection to be made 250. If one of the input device selector keys is actuated, the processor is signaled to receive text input from the corresponding input device 252. However, if none of the input device selector keys is actuated, the processor defaults to receive text from the scanner system 254 and may now receive text.

The processor then waits for a format structure selection key to be actuated 256. If one of the format structure selectors is actuated, the processor is prompted to retrieve from the ROM 50 the corresponding subroutine for the selected text format structure 258. If none of the format structure selector keys is actuated, the processor automatically defaults to the Outline subroutine and retrieves same from the ROM 260.

The processor next waits for required levels in the selected format structure to be completed, once those required levels are completed, then the processor waits for a format control key to be actuated.

The processor next waits for a format control key 32 to be actuated 262. If one of the format controls is actuated, the processor is signaled to move to the corresponding level within the selected text structure 264.

The processor then waits for a text attribute selection key 28 to be actuated 268. If one of the text attribute selector keys is actuated, the processor is signaled to retrieve a corresponding text attribute character from the ROM 50 to be applied to the prospective text string received 270.

The processor then receives a text string input from the selected input device and applies any selected character attributes to the text string and formats the text string according to the current level of the structure 272. After receipt and format of the text string, the processor waits for the ENTER key 118 to be actuated 274. If the ENTER key is actuated, the processor moves to the next level within the structure 276. If the ENTER button is not actuated, the processor waits for a format control switch 32 to be actuated 278. If none of the format control keys is actuated, the processor remains at the same level in the structure and adds the next text string received to the end of the previous text string 272. If one of the format control keys is actuated, the processor is signaled to move to the corresponding level within the text structure 280.

The processor 46 then checks to see if the New Notes select key 93 is actuated 282. If not, the processor then returns to step 268 and checks if a text attribute selector key is actuated. If the New Notes select key is actuated, the processor stores the formatted text strings in the data storage unit 56 and clears the display screen 284. The processor then returns to step 250 to repeat the above-described process.

The text acquisition and organizing system 10 in the above embodiment is portable and may be easily carried. Similarly, the system 10 shown above may be conveniently stowed during periods of non-use. When the system is to be used, the user may transport same to the desired location and flip the on-off switch 44 to empower the system. When use has been completed, the user turns off the power to the system 10; however, text stored in the system 10 remains in a non-volatile memory as does all programs.

Those skilled in the art will appreciate the convenience and efficiency of providing a text acquisition and organizing system that may acquire text directly from an existing source of text, rather than requiring the desired text to be recreated by the user, such as by entering the text via a keyboard. Such feature is especially important where the user is not proficient at using a keyboard, where time is limited, or where there is a relatively large amount of text to be copied.

Furthermore, the automatic formatting of the text strings as such text strings are received into a selected format structure will be appreciated by those skilled in the art as an efficient means for organizing related text into a useful form. Such automatic formatting results in an efficient one-step process for acquiring and organizing desired text whereby the user simply chooses the desired text and the processor automatically formats such text into the selected structure. One press of the keys is typically all that is required to acquire and organize text with the disclosed system as opposed to dealing with a complex word processing system requiring multiple key presses for organizing text in any manner. However, the system shown in the drawings and described above also has a large degree of flexibility with the various keys provided. The format may be altered. Particularly valuable is the storage of the organized text strings in a common language on a removable storage medium such as a floppy disk. Should the user desire to use the acquired and organized text in a more powerful word processing program, he or she need only read the file from the floppy disk and manipulate the data with that program.

While a particular form of the invention has been illustrated and described, it will be apparent to those familiar with the art that various modifications and improvements can be made without departing from the scope of the invention as defined by the following claims.

What is claimed is:

1. An apparatus for acquiring discrete text strings and for organizing the acquired text strings into a format structure as the text strings are acquired, the apparatus comprising:

a housing of a size small enough to be portable;

a scanner connected to the housing that scans printed text strings and acquires the text strings;

manual format structure select means mounted in the housing for providing a structure select signal corresponding to one of a plurality of predetermined selectable format structures;

a memory in the housing in which are stored the plurality of format structures each of which comprises a plurality of predetermined formatting commands for assignment to the text strings in a predetermined order as the text strings are acquired to position acquired text strings in relation to other acquired text strings in a predetermined order;

a processor mounted in the housing, wherein the processor is:

responsive to the structure select signal to retrieve the corresponding format structure from the memory;

responsive to the retrieved format structure for automatically formatting the acquired text strings to position said acquired text strings according to the retrieved format structure as the text strings are acquired;

a memory mounted in the housing for storing the series of text strings after having been formatted by the processor in accordance with the selected text format structure; and a display mounted on the housing for displaying the formatted text strings in the selected format structure.

2. The apparatus of claim 1 further including:

a manual format control switch mounted in the housing, actuation of which provides a format control signal;

wherein the processor is responsive to the format control signal to alter the predetermined order of application of formatting commands within the selected format structure to a subsequently acquired text string.

3. The apparatus of claim 2 wherein the manual format control switch comprises a switch mounted on the scanner for providing the format control signal.

4. The apparatus of claim 1 further comprising:

a comments switch mounted on the housing for providing a comments signal;

wherein the processor is responsive to the comments signal to automatically place a subsequently acquired text string within a border and to automatically adjust the size of the border to accommodate the entirety of the subsequently acquired text string and to automatically place the bordered text string at a predetermined position.

5. The apparatus of claim 1 further comprising:

a comments switch mounted on the housing for providing a comments signal; and a signal switch mounted on the housing for providing a control signal;

wherein the processor is responsive to the comments signal followed by the control signal to automatically place a predetermined text string within a border and to automatically adjust the size of the border to accommodate the entirety of the text string accompanied by a number automatically assigned to identify that bordered text string, the processor also automatically placing the bordered and numbered text string at a predetermined position.

6. The apparatus of claim 5 wherein processor automatically increases the number assigned to subsequent bordered text strings to uniquely identify each bordered text.

7. The apparatus of claim 1 further comprising:

a footnote switch for providing a footnote signal;

wherein the processor is responsive to the footnote signal to automatically connect subsequently acquired discrete strings of text with predetermined punctuation and to automatically locate the acquired and punctuated text strings in a predetermined position in relation to other text.

8. The apparatus of claim 7 wherein the processor is responsive to the footnote signal to provide a prompt comprising a footnote panel containing the names of a plurality of discrete text strings to be acquired in a predetermined order to be connected together to form a footnote.

9. The apparatus of claim 8 wherein the footnote panel further comprises a display of the discrete acquired text strings as they are acquired permitting a review of the acquired text string before leaving the footnote panel.

10. The apparatus of claim 9 further comprising an additional panel from which a discrete data string for the footnote may be acquired, said panel including numeric text.

11. The apparatus of claim 1 further including:

text attribute control means mounted in the housing for providing text attribute command signals;

wherein the processor is responsive to the text attribute command signals to affect the format of a subsequently acquired text string in accordance with the text tribute command signals as the text string is received.

12. The apparatus of claim 1 further comprising:

means for receiving text and displaying the received text on the display; and means for selecting a text string from the displayed text and acquiring the selected text string;

wherein the processor is responsive to the retrieved format structure for automatically formatting the text string acquired from the display to position said acquired text string according to the retrieved format structure as the text string is acquired.

13. A note-taking apparatus for acquiring existing text from an external text source, for organizing the acquired text into a format structure as the text is acquired, and for adding notes to the format structure concerning the acquired text, the apparatus comprising:

a housing;

a portable scanner connected to the housing, the scanner adapted to scan a single text line at a time to acquire text;

manual format structure select means mounted in the housing for providing a structure select signal corresponding to one of a plurality of predetermined selectable format structures;

a memory in the housing in which are stored the plurality of format structures each of which comprises a plurality of predetermined formatting controls for assignment to the acquired text in a predetermined order as the text is acquired to position acquired text in relation to other acquired text in a predetermined order;

a manual format control switch mounted in the housing, actuation of which provides a format control signal;

a processor mounted in the housing, wherein the processor is:

responsive to the structure select signal to retrieve the corresponding format structure from the memory;

responsive to the retrieved format structure for automatically formatting the acquired text to position said acquired text according to the retrieved format structure as the text is acquired;

responsive to the format control signal to alter the predetermined order of application of formatting controls within the selected format structure to subsequently acquired text;

a memory mounted in the housing for storing the text after having been formatted by the processor in accordance with the selected text format structure; and a display mounted on the housing for displaying the formatted text in the selected format structure.

14. The note-taking apparatus of claim 13 further comprising:

a comments switch mounted on the housing for providing a comments signal;

wherein the processor is responsive to the comments signal to automatically place subsequently acquired text within a border and to automatically adjust the size of the border to accommodate the entirety of the subsequently acquired text and to automatically place the bordered text at a predetermined position.

15. The note-taking apparatus of claim 13 further comprising:

a comments switch mounted on the housing for providing a comments signal; and a signal switch mounted on the housing for providing a control signal;

wherein the processor is responsive to the comments signal followed by the control signal to automatically place a predetermined text within a border and to automatically adjust the size of the border to accommodate the entirety of the text accompanied by a number automatically assigned to identify that bordered text, the processor also automatically placing the bordered and numbered text at a predetermined position.

16. The note-taking apparatus of claim 15 wherein processor automatically increases the number assigned to subsequent bordered text strings to uniquely identify each bordered text.

17. The note-taking apparatus of claim 13 further comprising:

a footnote switch for providing a footnote signal;

wherein the processor is responsive to the footnote signal to automatically connect subsequently acquired discrete strings of text with predetermined punctuation and to automatically locate the acquired and punctuated text strings in a predetermined position in relation to other text.

18. The note-taking apparatus of claim 17 wherein the processor is responsive to the footnote signal to provide a prompt comprising a footnote panel containing the names of a plurality of discrete text strings to be acquired in a predetermined order to be connected together to form a footnote.

19. The note-taking apparatus of claim 18 wherein the footnote panel further comprises a display of the discrete acquired text strings as they are acquired permitting a review of the acquired text string before leaving the footnote panel.

20. The note-taking apparatus of claim 19 further comprising an additional panel from which a discrete data string for the footnote may be acquired, said panel including numeric text.

21. The note-taking apparatus of claim 13 further including:

text attribute control means mounted in the housing for providing text attribute command signals;

wherein the processor is responsive to the text attribute command signals to affect the format of subsequently acquired text in accordance with the text attribute command signals as the text is received.

22. The note-taking apparatus of claim 13 further comprising:

means for receiving text and displaying the received text on the display; and means for selecting a text string from the displayed text and acquiring the selected text string;

wherein the processor is responsive to the retrieved format structure for automatically formatting the text string acquired from the display to position said acquired text string according to the retrieved format structure as the text string is acquired.

23. The note-taking apparatus of claim 13 wherein the housing is of a size small enough to be portable.

* * * * *